T. SNOW.
TWO-WHEELED VEHICLES.
No. 183,225.   Patented Oct. 10, 1876.
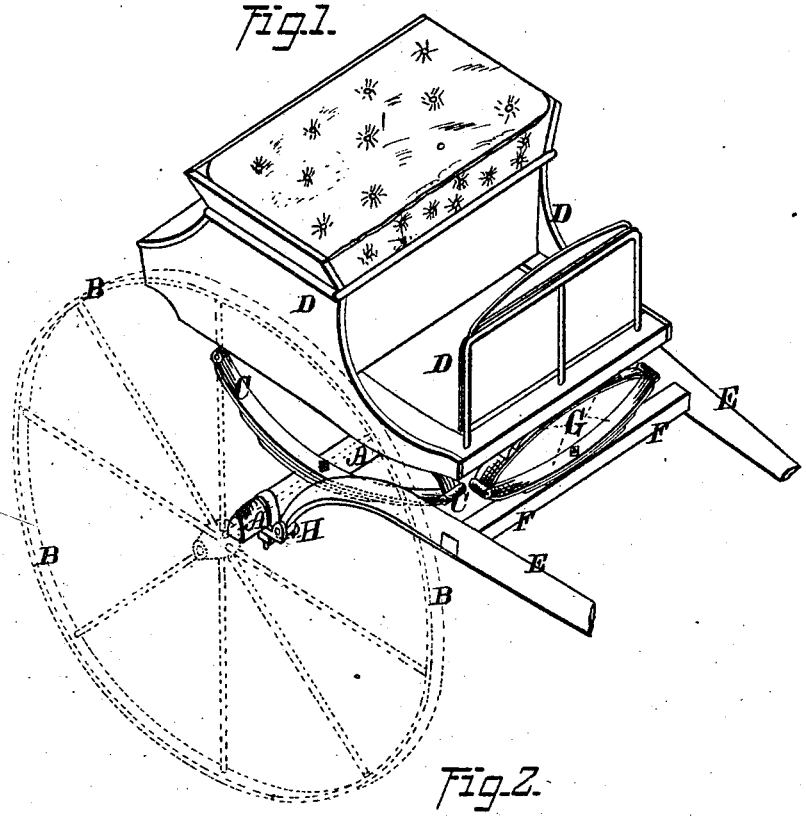
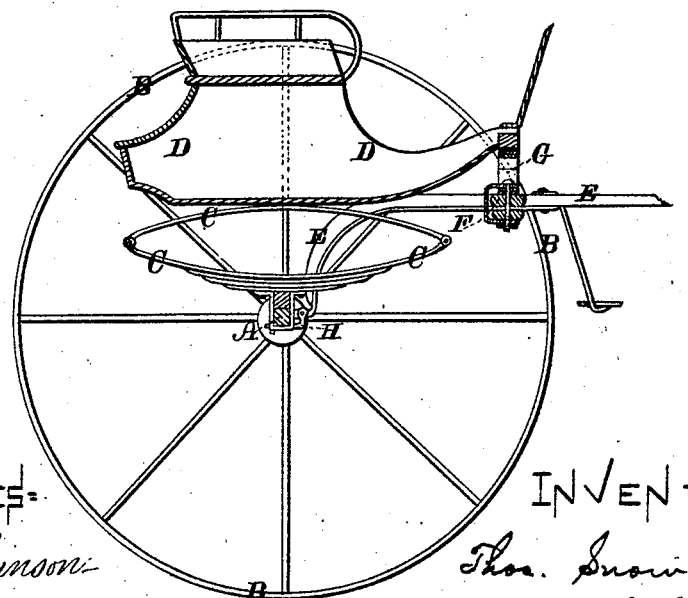

UNITED STATES PATENT OFFICE.

THOMAS SNOW, OF SOCIAL CIRCLE, GEORGIA.

IMPROVEMENT IN TWO-WHEELED VEHICLES.

Specification forming part of Letters Patent No. 183,225, dated October 10, 1876; application filed August 8, 1876.

*To all whom it may concern:*

Be it known that I, THOMAS SNOW, of Social Circle, in the county of Walton, and in the State of Georgia, have invented certain new and useful Improvements in Sulkies or Two-Wheeled Carriages; and do hereby declare that the following is a full, clear, and exact description thereof, reference being had to the accompanying drawing, making a part of this specification, in which—

Figure 1 is a perspective view of my improved vehicle, and Fig. 2 is a vertical central section upon a line passing from front to rear.

Letters of like name and kind refer to like parts in each of the figures.

The design of my invention is to avoid the unpleasant oscillating movement that is communicated to the body of a two-wheeled vehicle by the vertical motion of its horse; to which end it consists, principally, in a two-wheeled vehicle in which the forward end of the body is connected to or with the shafts, by means of a spring, substantially as and for the purpose hereinafter specified.

It consists, further, in combining with said spring-connection, between said body and shafts, a flexible joint between the rear end of the latter and the axle, substantially as and for the purpose hereinafter shown.

In the annexed drawings, A represents the axle, B and B the ground-wheels, C and C two elliptical springs, and D the body, of a sulky, all constructed and combined in the usual manner. Connected to or with the axle A, outside of the springs C and C, are two shafts, E, which from thence extend forward, and are connected together at or slightly in rear of the front end of the body D by means of a crossbar, F, which latter has secured to its upper side an elliptic spring, G, that extends between the same and said body, and is connected in a like manner with the latter. The connection H between each shaft E and the axle A is hinged or otherwise constructed so as to be flexible vertically, and enable the outer ends of said shafts to move in such direction without communicating their motion to said axle. The spring G operates in the same manner as the flexible connections H and H, and prevents in a great degree the transmission of vertical motion from the shafts to the body. Said spring may be employed without said flexible connections, if desired; but the best result is produced when said parts are used simultaneously.

By means of this improvement nearly all oscillating motion of the body is prevented, and the vehicle rendered as comfortable in this respect as those supported upon four wheels.

Having thus fully set forth the nature and merits of my invention, what I claim as new is—

1. A two-wheeled vehicle, provided with a body which supports a seat, and having the forward end of said body connected to or with the shafts by means of a spring, substantially as and for the purpose specified.

2. In combination with the spring-connection between the front end of the body and the shafts, a flexible joint between the rear ends of said shafts and the axle, substantially as and for the purpose shown.

In testimony that I claim the foregoing I have hereunto set my hand this 29th day of July, 1876.

THOMAS SNOW.

Witnesses:
A. S. FLORENCE,
B. F. BLASINGAME.